United States Patent [19]
Petty et al.

[11] Patent Number: 5,172,408
[45] Date of Patent: Dec. 15, 1992

[54] SPEAKERPHONE STATE-CONTROLLED ALERTING ARRANGEMENT

[75] Inventors: Norman W. Petty, Boulder; Thomas J. Tierney, Jr., Aurora, both of Colo.

[73] Assignee: AT&T Bell Laboratories, Murray Hill, N.J.

[21] Appl. No.: 561,034

[22] Filed: Aug. 1, 1990

[51] Int. Cl.$^5$ .............................................. H04M 3/42
[52] U.S. Cl. .................................. 379/215; 379/373; 379/375; 379/388; 379/390
[58] Field of Search ............... 379/388, 389, 390, 420, 379/432, 372, 215, 373, 375, 387

[56] References Cited

U.S. PATENT DOCUMENTS

| | | |
|---|---|---|
| 3,197,570 | 7/1965 | Lambourn . |
| 3,919,493 | 11/1975 | Person et al. . |
| 4,101,735 | 7/1978 | Bridenbaugh .................. 379/420 |
| 4,185,173 | 1/1980 | Kerman et al. . |
| 4,315,109 | 2/1982 | Jacobson . |
| 4,400,581 | 8/1983 | Jacobson ........................ 379/388 |
| 4,496,798 | 1/1985 | Colardelle et al. . |
| 4,497,980 | 2/1985 | Gorman et al. ................. 379/373 |
| 4,523,058 | 6/1985 | Stevens et al. .................. 379/375 |
| 4,677,661 | 6/1987 | van Gilluwe et al. ........... 379/159 |
| 4,700,382 | 10/1987 | Means et al. .................... 379/390 |
| 4,716,585 | 12/1987 | Tompkins et al. ............... 379/202 |
| 4,955,055 | 9/1990 | Fujisaki et al. ................. 379/388 |

FOREIGN PATENT DOCUMENTS

| | | |
|---|---|---|
| 0130553 | 6/1984 | European Pat. Off. . |
| 0330384 | 2/1989 | European Pat. Off. . |
| 0376866 | 12/1989 | European Pat. Off. . |

OTHER PUBLICATIONS

Gary Kloesz & Dennis Morgan, *Hands Free Telephone Conversations are Simplified Using New Integrated Circuits*, IEEE Transactions on Consumer Electronics, vol. CE-31, No. 3, Aug. 1985, 552-559.
"Motorola MC34018 Speakerphone Network", product specification, pp. 2-249 to 2-250, Motorola Semiconductor, Inc.
"Voice Switched Speakerphone Circuit", product description, IC Master catalog, p. 2944, (1988).

Primary Examiner—James L. Dwyer
Assistant Examiner—Jhancy Augustus
Attorney, Agent, or Firm—D. Volejnicek

[57] ABSTRACT

A telephone station set (100) alerting arrangement preferably uses a a speakerphone loudspeaker (140) to produce audible alerting signals (e.g., ringing signals )from locally-generated (105, 115) alerting signals both when the set is on-hook and when the set is off-hook. The present state of the speakerphone control circuit (102) is used to control the volume of the produced audible alerting signals: high-volume alerting signals are supplied to the loudspeaker when the control circuit (102) is used to control the volume of the produced audible alerting signals: high-volume alerting signals are supplied to the loudspeaker when the control circuit is in talking state (202), and low-volume, attenuated alerting signals are supplied to the loudspeaker when the control circuit is in listening state (201). The appearance of alerting signals when the speakerphone control circuit is in idle state (200) causes the speakerphone circuit to make a transition to the talking state.

15 Claims, 6 Drawing Sheets

SPEAKERPHONE STATE-CONTROLLED ALERTING ARRANGEMENT

CROSS-REFERENCE TO RELATED APPLICATION

This application is related in subject matter to an application entitled, "Context Dependent Alerting Arrangement", filed Aug. 18, 1989, Ser. No. 07/423,299, now pending, which has the same inventors and owner as this application.

TECHNICAL FIELD

This application is related to telecommunications station sets in general, and to call-alerting arrangements of such sets in particular.

BACKGROUND OF THE INVENTION

The prior art has used various audible signals, ringers, buzzers, etc., as well as visual signals such as light bulbs, to alert a party of the arrival of an incoming call to the party's telephone station set. The audible alerting tones that are produced at the telephone station set to signal an incoming call are typically constant in volume regardless of the busy/idle state of the telephone. Therefore, if the called party is already off-hook and engaged in an existing call, the audible alerting signal of a second incoming call may be very disturbing and irritating, and especially so if the existing call is on a speakerphone. Because speakerphones generally permit only one-way communications, i.e., switching between transmit and receive depending on which party is presently speaking, or is the loudest if both started speaking simultaneously, an incoming alerting signal may not only disturb and annoy the two parties but may also disrupt communications between the two parties.

The prior art also has taught the use of the speakerphone of a telephone station set to generate audible alerting signals. When the set is on-hook, it responds to receipt of notification of an incoming call (e.g., a ringing signal on the telephone line) by connecting an alerting signal generator to the loudspeaker of the speakerphone and driving the loudspeaker with output of the alerting signal generator to produce the audible alerting tone. When the set is off-hook, however, the alerting signal generator is not used to produce an audible alerting tone. In order to cause the speakerphone loudspeaker to produce an audible alerting tone in this instance, it is necessary for the set to receive an alerting tone directly over the telephone line, like a voice signal, which alerting tone is then applied by the set to the speakerphone loudspeaker just like a received voice signal, and is thusly made audible by the loudspeaker.

The disadvantages of this prior art approach are evident: it requires two separate mechanisms for audible alerting tone generation, one for use when the set is on-hook and a different one for use when the set is off-hook. Plus, the latter mechanism requires that the entity to which the set is connected by the telephone line (e.g., a telephone switching system such as a central office switch or a private branch exchange) have the capability of generating alerting signals in voice signal form.

Merely allowing one of the prior art speakerphone alerting mechanisms to be used at all times, regardless of whether the set is on-hook or off-hook, does avoid some disadvantages, only to replace them with new ones. On one hand, use of the prior art off-hook mechanism at all times requires the set to be able to respond to voice signal-type alerting signals while it is on-hook-no easy or inexpensive task. On the other hand, use of the prior art on-hook mechanism at all times creates the problems set forth at the beginning of this discussion. Moreover, these problems are especially acute for telephone station sets that use the speakerphone to generate the audible alerting signal. In the speakerphone, the loudspeaker and the microphone are located in close proximity to each other, very much closer than is typically the case between a conventional telephone station set ringer and a microphone of the station set when the set is off-hook. Consequently, the speakerphone loudspeaker-generated alerting signals more readily and more strongly affect the speakerphone microphone and cause more interference, annoyance, and disruption thereby, than would typically be true of non-speakerphone generated alerting signals.

SUMMARY OF THE INVENTION

The invention is directed to solving these and other problems and disadvantages of the prior art. Generally according to the invention, a telecommunications station set, such as a telephone station set, generates outgoing signals and receives incoming signals, and includes an arrangement for generating audible alerting signals both when the set is on-hook and when it is off-hook and whose volume depends on the activity states of lines that carry the outgoing and incoming signals. The arrangement includes means for generating audible alerting signals, and means for controlling the volume of the audible alerting signals as a function of the strengths of the outgoing and the incoming signals.

Specifically according to an aspect of the invention, the telecommunication station set uses the same arrangement to produce audible alerting signals (e.g., ringing signals) both while it is on-hook and while it is off-hook, and controls the volume of the produced audible alerting signals in accordance with speakerphone control states. The set includes a speakerphone loudspeaker or some other means for converting received alerting signals (e.g., ringing signals) into audible alerting signals. The set also includes an arrangement that responds to communications signals received by the station set by generating a plurality of speakerphone control state signals, e.g., signals indicative of individual ones of speakerphone idle, listening, and talking states. Illustratively, this arrangement is the speakerphone control circuit itself. The set further includes an alert-signal generating arrangement that supplies the alerting signals to the loudspeaker or other signal conversion means, while the station set is on-hook and also while the station set is off-hook, for conversion into audible alerting signals. Significantly, the alert-signal generating arrangement is responsive to the speakerphone control state signal generating arrangement: when the latter generates a first control state signal, representative of, e.g., a speakerphone talking state, the former supplies alerting signals convertible into first audible alerting signals having a volume, e.g., a normal or loud volume; when the latter generates a second control state signal, representative of, e.g., a speakerphone listening state, the former supplies alerting signals convertible into second audible alerting signals having a volume different from the volume of the first audible alerting signals, e.g., an attenuated or low volume.

The invention is especially suited for implementation in a station set that includes a speakerphone with a loudspeaker, and consequently already also includes a speakerphone control circuit having a plurality of control states for controlling operation of the speakerphone. According to the invention, the station set includes an arrangement for generating alerting signals and supplying the alerting signals to the loudspeaker, while the station set is on hook and also while the station set is off-hook, for conversion into audible alerting signals (e.g., ringing). If the control circuit is in a first control state (illustratively, talking), the arrangement supplies to the loudspeaker first alerting signals for conversion thereby into first audible signals having a volume, illustratively a "normal" volume. If the control circuit is in a second control state (illustratively, listening), the arrangement supplies to the loudspeaker second alerting signals for conversion thereby into second audible alerting signals having a volume different from (illustratively lower than) the volume of the first audible alerting signals. Further illustratively, if the control circuit is in a third control state (illustratively, idle), it makes a transition to the first control state to supply alerting signals to the loudspeaker.

The invention uses a single arrangement for producing alerting signals both when the station set is on-hook and off-hook. It thus eliminates the need for two separate arrangements, one for when the set is on-hook and the other for when the set is off-hook. The arrangement preferably uses the speakerphone loudspeaker to generate audible alerting signals, and thereby avoids the need for a separate source of audible alerting signals, such as a ringer. The arrangement generates the alerting signals in the station set, and thereby frees apparatus that is connected to the station set over a telephone line from having to generate signals directly convertible by the loudspeaker into audible alerting signals. Yet, by controlling the volume of the audible alerting signal as a function of the state of a speakerphone control circuit, the arrangement avoids the disadvantages associated with constant-volume audiblealerting signaling, and ensures that the audible alerting signals are not disturbing or irritating to either party to an ongoing call and do not disrupt the ongoing call.

These and other advantages and features of the present invention will become apparent from the following description of an illustrative embodiment of the invention taken together with the drawing.

DETAILED DESCRIPTION

Figure 1:
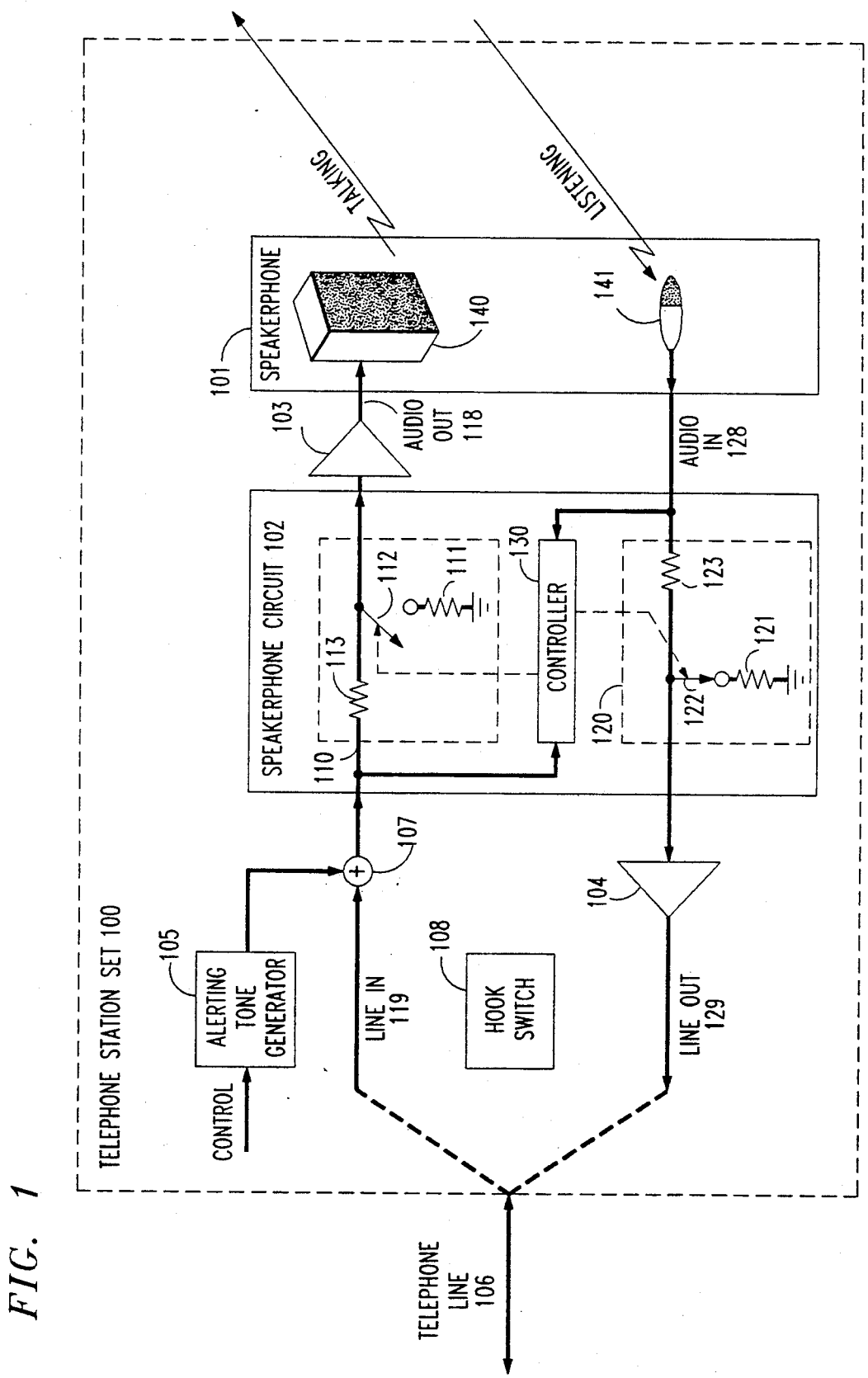
FIG. 1 is a block diagram of a telephone station set that includes a first illustrative embodiment of the invention.

FIG. 1 shows a telephone station set 100, which is a conventional set but for modifications described herein. As is conventional, set 100 includes a hookswitch 108, a conventional remote speakerphone 101, and a conventional speakerphone circuit 102 for controlling the operation of speakerphone 101. Speakerphone 101 includes a loudspeaker 140 and a microphone 141. The input of loudspeaker 140 and the output of microphone 141 are connected to speakerphone circuit 102 by an AUDIO OUT line 118 and an AUDIO IN line 128, respectively. Speakerphone circuit 102 connects lines 118 and 128 to LINE IN line 119 and LINE OUT line 129, respectively. Lines 119 and 129 are in turn connected, through conventional circuitry of set 100 (not shown) to a telephone line 106. Audio, e.g., voice, signals incoming on telephone line 106 appear on LINE IN line 119, and audio signals outgoing on telephone line 106 are supplied thereto by LINE OUT line 129. An output of speakerphone circuit 102 is connected to LINE OUT line 129 through a conventional amplifier 104. Similarly, a second output of speakerphone circuit 102 is connected to AUDIO OUT line 118 through a conventional amplifier 103. Amplifiers 103 and 104 merely boost the signal strength of signals incoming thereto and transmit the boosted signals at their outputs.

LINE IN line 119 is connected to the input of amplifier 103 through a switched attenuator circuit 110 of speakerphone circuit 102. Circuit 110 is illustratively a conventional voltage-divider circuit that has a first resistor 113 in line with the input of amplifier 103, and a second resistor 111 that is selectively switched between ground and the signal path between LINE IN 119 and amplifier 103 by a switch 112. Operation of switch 112 is controlled by controller 130 of speakerphone circuit 102.

Similarly, AUDIO IN line 128 is connected to the input of amplifier 104 through a switched attenuator circuit 120 of speakerphone circuit 102. Circuit 120 duplicates circuit 110 and includes a first resistor 123 in line with the input of amplifier 104, and a second resistor 121 that is selectively switched between ground and the signal path between AUDIO IN line 128 and amplifier 104 by a switch 122. Operation of switch 122 is also controlled by controller 130.

Figure 2:
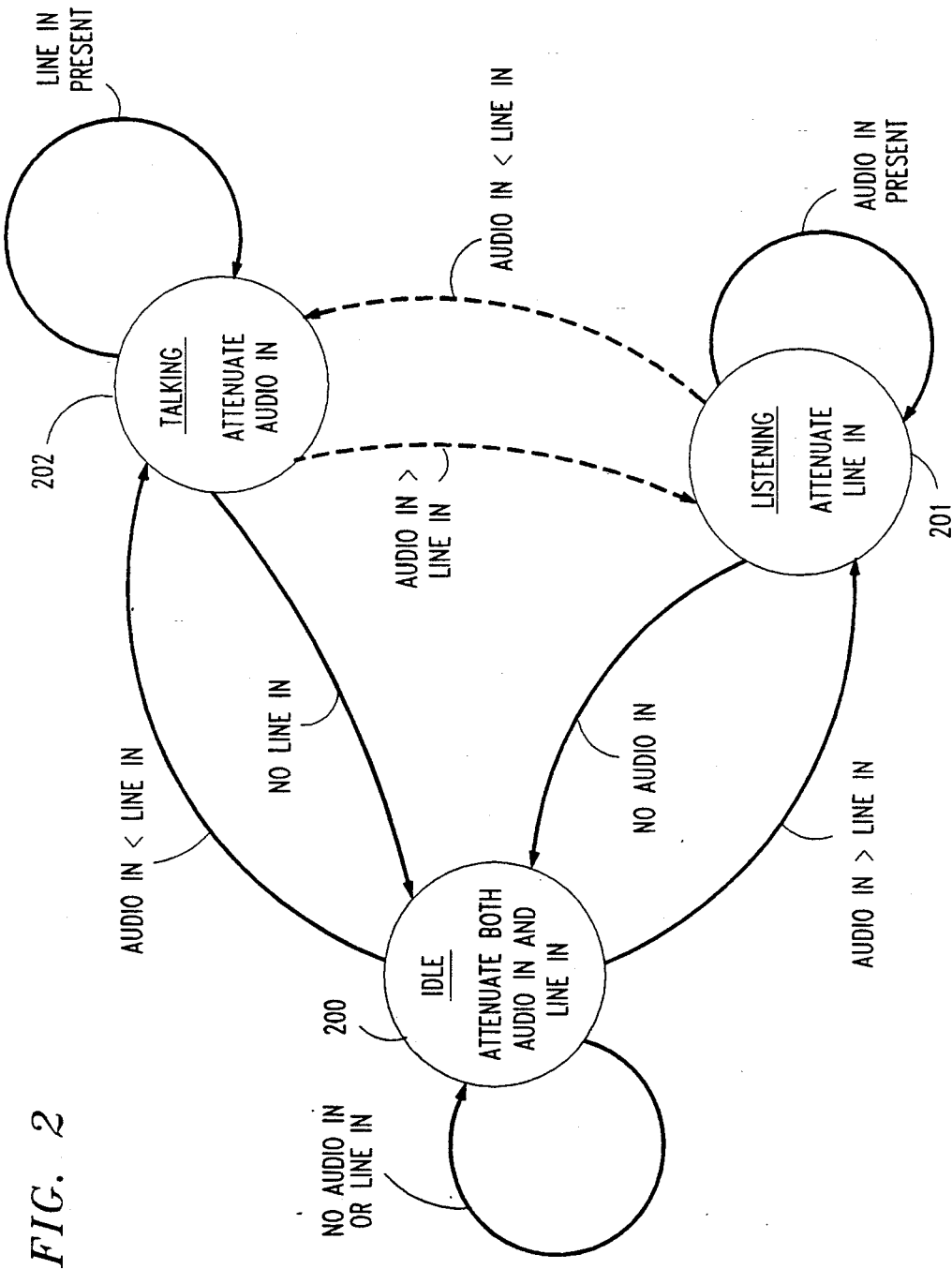
FIG. 2 is a state diagram of the states of the speakerphone circuit of the set of FIG. 1.

Controller 130 exerts control on circuits 110 and 120 in response to activity that it senses on LINE IN line 119 and AUDIO IN line 128, in a manner that illustratively creates three operational states for circuit 102. This is illustrated in FIG. 2.

When no input signals—neither signals on LINE IN line 119 nor signals on AUDIO IN line 128—are present, controller 130 sets circuit 102 into idle state 200, wherein both resistors 111 and 121 are switched into their respective signal paths. When controller 130 senses presence of input signals, it causes circuit 102 to leave idle state 200 and to assume one of listening state 201 and talking state 202, depending upon the relative strength—volume—of the line in and audio in signals. If the audio in signals are stronger than the line in signals, controller 130 causes circuit 102 to assume listening state 201, wherein resistor 111 is switched into its signal path to attenuate the line in signals input to loudspeaker 140. If the audio in signals are weaker than the line in signals, controller 130 causes circuit 102 to assume talking state 202, wherein attenuator 121 is switched into its signal path to attenuate the output of microphone 141 to LINE OUT line 129. Typically, if listening state 201 was assumed by circuit 102, controller 130 will keep circuit 102 in state 201 for as long as audio in signals are present, and will return circuit 102 to idle state 200 upon detecting absence of the audio in signals. Likewise, if talking state 202 was assumed by circuit 102, controller 130 will keep circuit 102 in state 202 for as long as line in signals are present, and will return circuit 102 to idle state 200 upon detecting absence of the line in signal. In idle state 200, the above-described check of the relative strengths of the audio in and line in signals is then repeated.

Alternatively, though, it is possible for controller 130 to switch between talking state 202 and listening state 201 as the relative signal strengths of the audio in and the line in signals change, and for idle state 200 to be resumed only when controller 130 ceases to sense any input signals. This alternative is shown by dashed lines in FIG. 2. It is not a favored alternative from a human factors standpoint.

As described so far, telephone station set 100 and its operation are conventional. Conventionally, telephone station set 100 would also include an alerting tone generator, e.g., ringing tone generator, operable when set 100 is on-hook and connected directly to the input of loudspeaker 140 for driving loudspeaker 140 with alerting signals that cause loudspeaker 140 to produce audible alerting signals having a constant volume. However, according to the invention as shown in FIG. 1, set 100 includes an alerting tone generator 105 whose output is connected to the input of loudspeaker 140 through switched attenuator circuit 110. Thereby, the alerting signals that reach and drive loudspeaker 140 are controlled by the present state of speakerphone circuit 102. This causes loudspeaker 140 to produce audible alerting signals that vary in volume with the present state of speakerphone circuit 102.

Alerting tone generator 105 is activated to produce alerting signals, and is deactivated, in a conventional manner, via a CONTROL signal supplied thereto by conventional circuitry of set 100. Generator 105 is also conventional, and produces at its output constant-volume alerting signals. The output of generator 105 is combined with the audio in signals from AUDIO IN line 119 by a conventional summing circuit 107, and the combined signals are supplied from the output of circuit 107 to the input of switched attenuator circuit 110 and the line-monitoring input of controller 130.

The alerting operation of the above-described circuitry of set 100 is as follows. When set 100 is on-hook, no audio signals are present and speakerphone circuit 102 is in idle state 200. When set 100 receives notice of an incoming call, generator 105 is caused to generate and output alerting signals. The alerting signals pass through summing circuit 107 to speakerphone circuit 102. They are detected by controller 130, which responds by sending circuit 102 into talking state 202. Consequently, the alerting signals pass unattenuated through circuit 110 of speakerphone circuit 102 to amplifier 103, are amplified thereby, and then pass through AUDIO OUT line 118 to the input of loudspeaker 140. Being amplified and unattenuated alerting signals, they cause loudspeaker 140 to produce loud audible alerting signals.

When set 100 receives notice of abandonment of the incoming call before set 100 goes off-hook, or when set 100 goes off-hook, generator 105 is caused to cease producing alerting signals, the audible alerting signals produced by loudspeaker 140 stop, and speakerphone circuit 102 returns to idle state 200. If set 100 has gone off-hook, the call proceeds conventionally.

When set 100 is off-hook, e.g., a call is in progress, speakerphone circuit 102 is typically either in talking state 202 or listening state 201, depending upon whether the calling or the called party is talking, or talking the loudest. If set 100 receives notice of a second incoming call, e.g., as part of a call-waiting service, it again causes generator 105 to generate the alerting signals. The alerting signals are summed by circuit 107 with any voice signals incoming on LINE IN line 119. The combined signals pass through circuit 100 of speakerphone circuit 102 to amplifier 103, are amplified thereby, and then are passed to loudspeaker 140. If speakerphone circuit 102 momentarily happens to be in idle state 200 at that instant, detection of the incoming signals by controller 130 sends speakerphone circuit 102 into talking state 202. If speakerphone circuit 102 is in listening state 201 or talking state 202, the appearance of the alerting signals in conjunction with otherwisepresent audio signals has no effect on the state of speakerphone circuit 102 in the typical case described above in conjunction with FIG. 2. But in the alternative case there described, appearance of the alerting signals will cause circuit 102 to remain in talking state 202, or to switch from listening state 201 to talking state 202, depending on the present state.

Alerting signals reaching loudspeaker 140 while circuit 102 is in talking state 202 are amplified and unattenuated. Hence, loudspeaker 140 produces loud audible alerting signals. This ensures that the user of set 100 is able to hear the audible alerting signals above the other incoming audio signals, e.g., voice signals, to which he or she is listening. But the output of microphone 141 is attenuated by circuit 120 in talking state 202. Hence, although the audible alerting signals are picked up by microphone 141, they are attenuated by circuit 120 so as not to cause call disruption and annoying feedback to the other, remote, party to the call.

Alerting signals reaching loudspeaker 140 while circuit 102 is in listening state 201 are attenuated by circuit 110. Hence, loudspeaker 140 produces quiet audible alerting signals. This is desirable for two reasons. Firstly, loudspeaker 140 is quiescent in listening state 201, so loud audible alerting signals would be startling and annoying to the speakerphone user. Nor are loud audible alerting signals needed in order to be heard above other audible signals reproduced by loudspeaker 140. Secondly, the quiet audible alerting signals ensure that they are not picked up at all, or are picked up only very faintly, by microphone 141, so as not to cause call disruption and annoying feedback to the remote party to the call.

Figure 3:
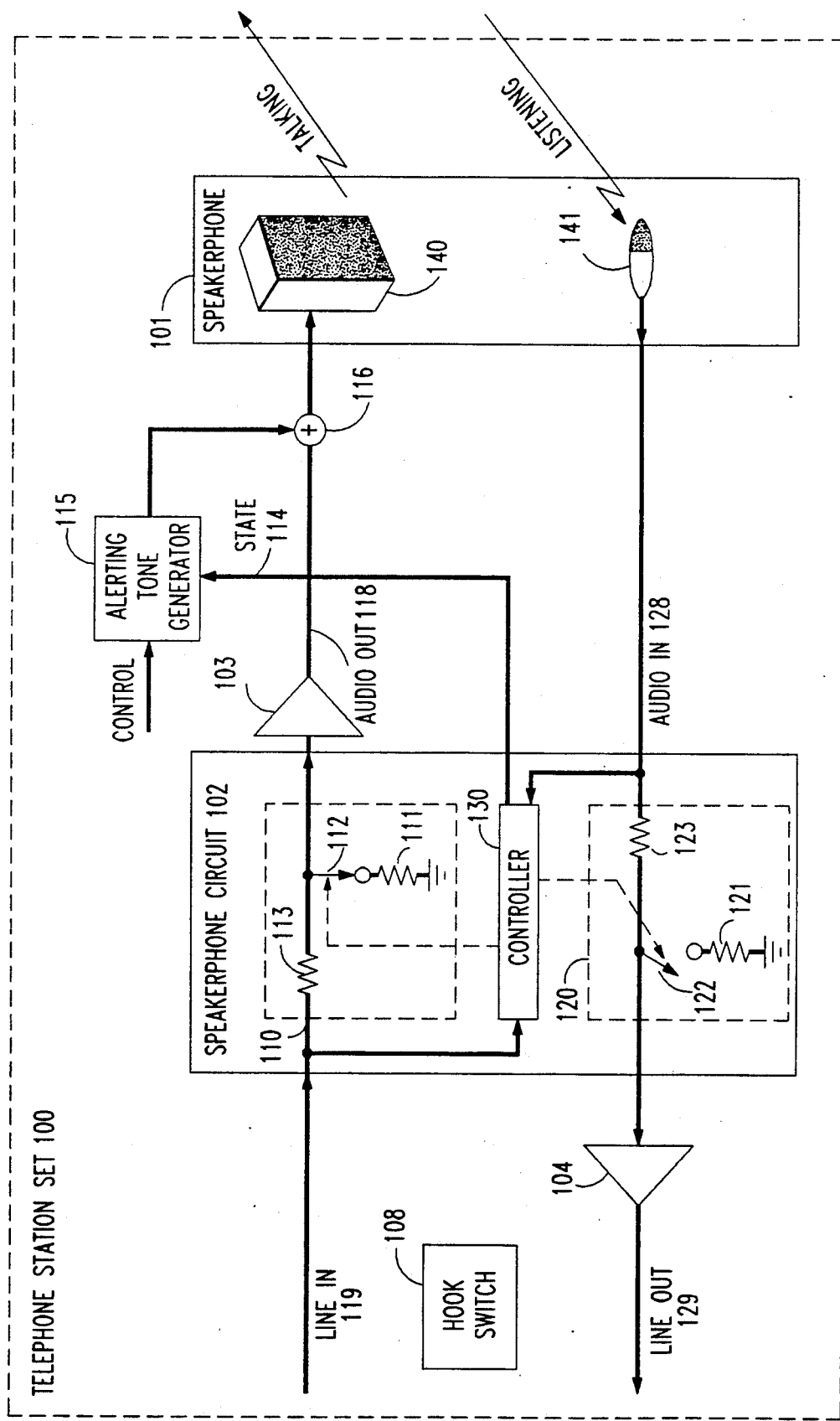
FIG. 3 is a block diagram of a telephone station set that includes a second illustrative embodiment of the invention.

FIG. 3 shows an alternative embodiment of the speakerphone statecontrolled alerting arrangement. In this embodiment, telephone station set 100 includes an alerting tone generator 115 that produces variable-strength alerting signals, and hence its output signals strength need not be controlled by switched attenuator circuit 110 of speakerphone circuit 102. Rather, the output of circuit 110 and the output of generator 115 are summed by a summing circuit 116 and the combined signals are applied thereby to the input of loudspeaker 140. Controller 130 of speakerphone circuit 102 has a state output connected by a STATE signal line 114 to a signal-strength control input of generator 115. Controller 130 generates on line 114 signals indicative of the present state of speakerphone circuit 102. Generator 115 receives these signals and responds to them by varying the strength of the alerting signals which is generates. Specifically, controller 130 keeps line 114 deasserted when circuit 102 is in idle state 200 and talking state 202, and asserts line 114 when circuit 102 is in listening state 201. Generator 115 generates full-strength alerting signals when line 114 is deasserted, and generates "attenuated", low-strength, alerting signals when line 114 is asserted.

Figure 4:
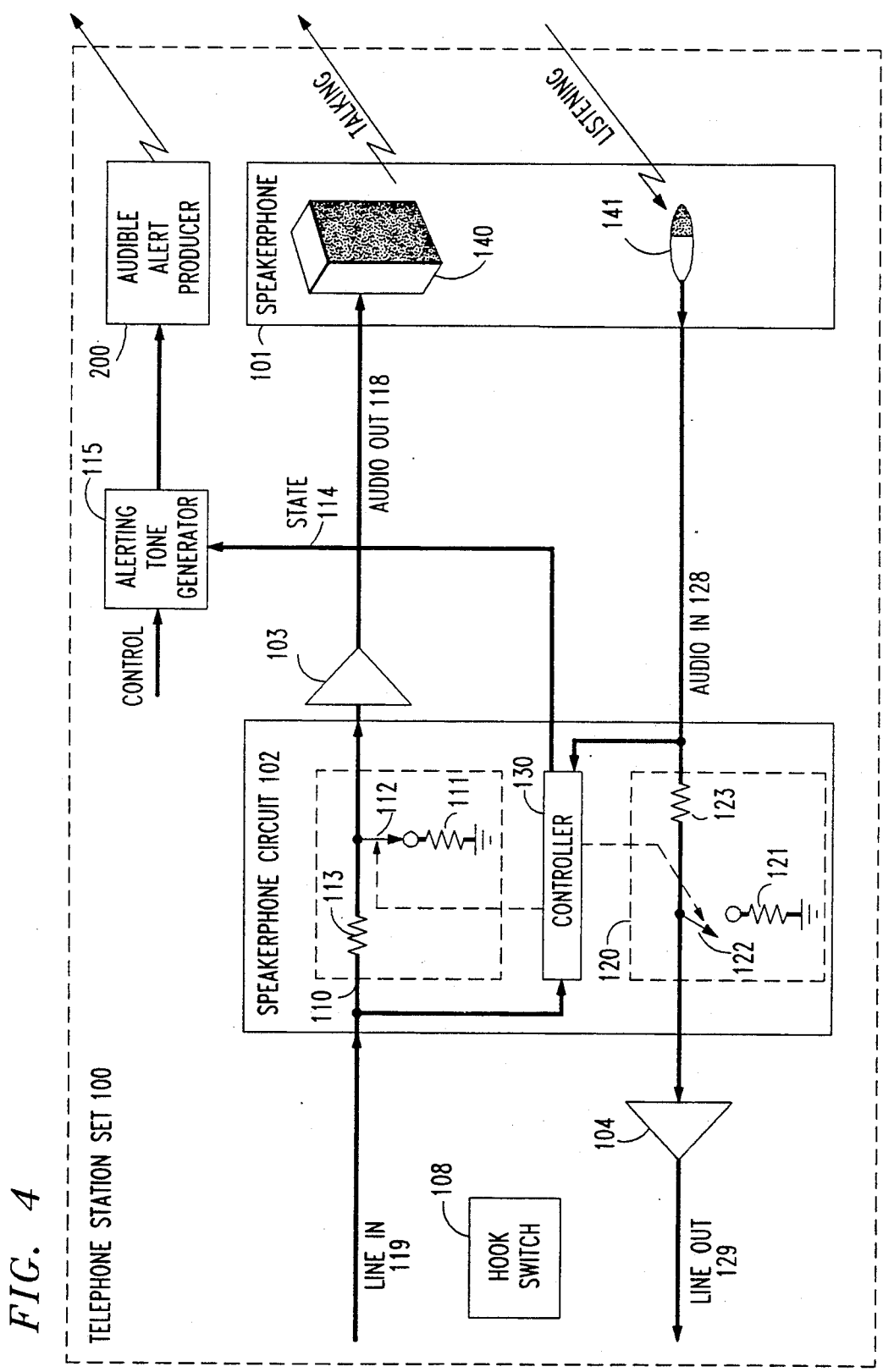
FIG. 4 is a block diagram of a telephone station set that includes a third illustrative embodiment of the invention.

The concept of the arrangement of FIG. 3 may be applied to an alternative embodiment of a set 100 that does not use the speakerphone loudspeaker to produce audible alerting tones, as shown in FIG. 4. FIG. 4 duplicates FIG. 3 with the exception that the output of generator 115 is not input to loudspeaker 140, but rather is input to, and drives, a separate audible alert producer 200, such as a ringer or a separate loudspeaker. Consequently, set 100 of FIG. 4 continues to use the same alerting mechanism while it is on-hook and off-hook, and the volume of the audible alerting signals continues to be controlled by the state of speakerphone circuit 102.

Figure 5:
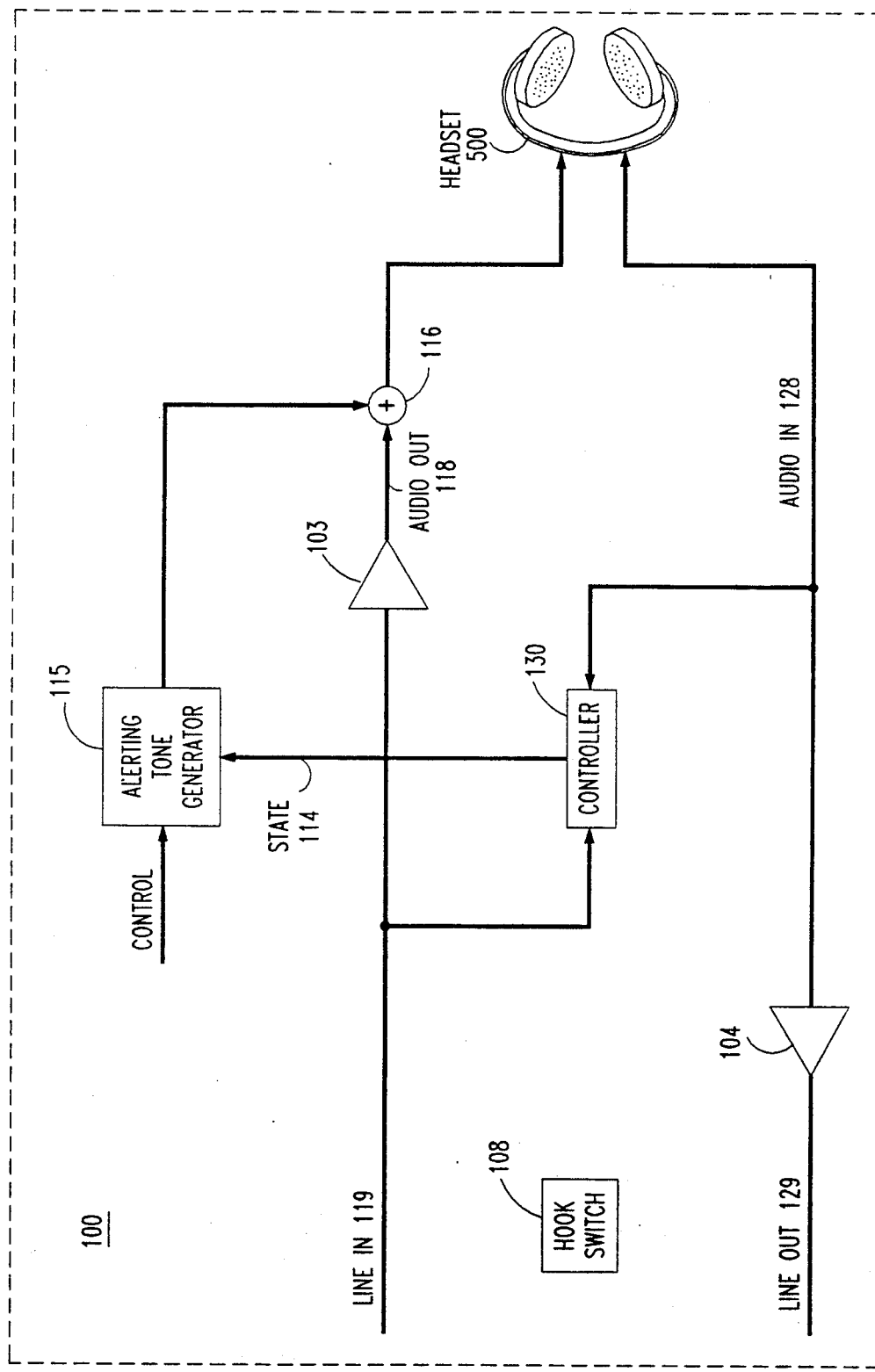
FIG. 5 is a block diagram of a telephone station set that includes a fourth illustrative embodiment of the invention.
Figure 6:
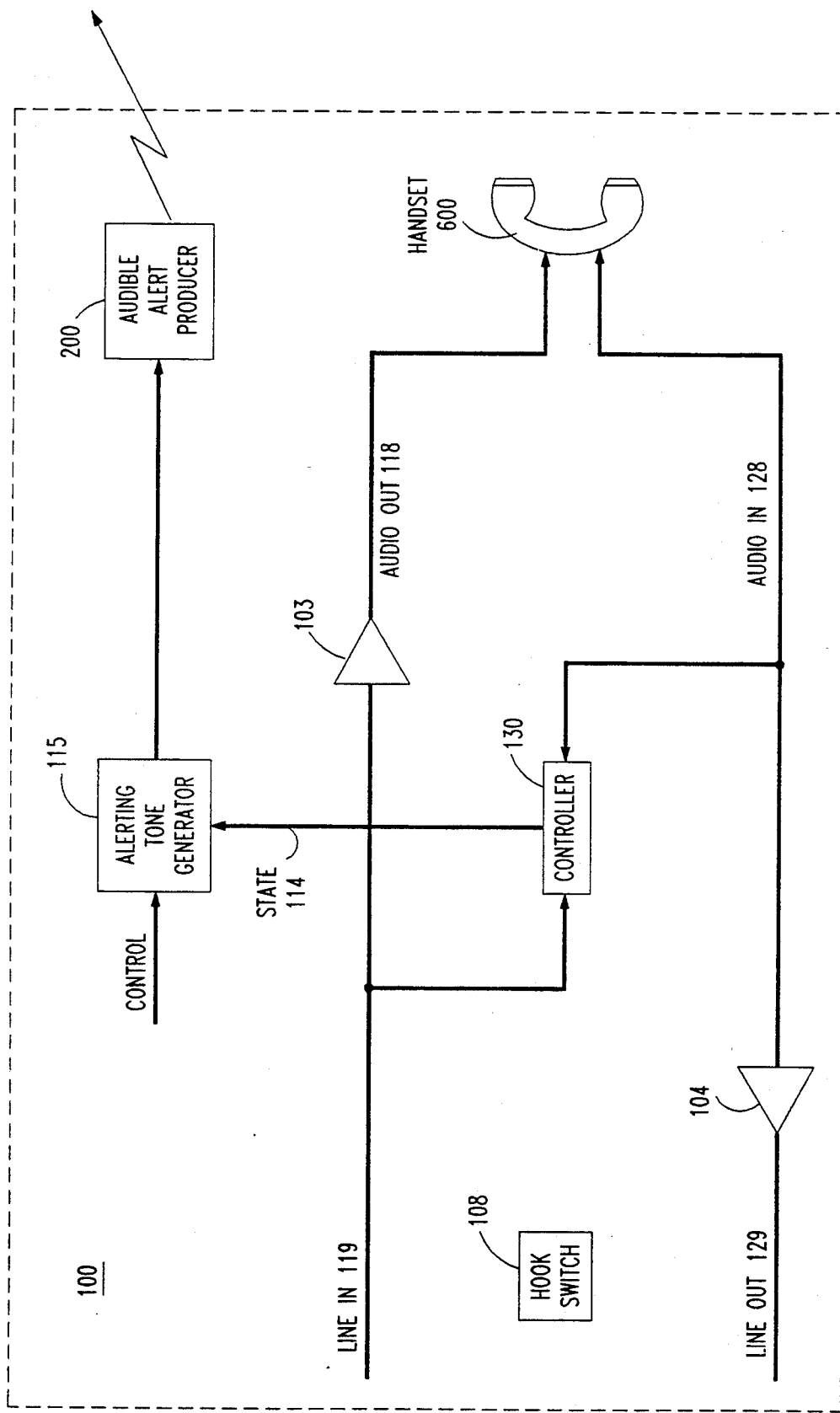
FIG. 6 is a block diagram of a telephone station set that includes a fifth illustrative embodiment of the invention.

As a further variation, the concept of the arrangement of FIG. 3 may be applied to an alternative embodiment of a set 100 that does not include a speakerphone, as shown in FIGS. 5 and 6.

FIG. 5 shows a station set 100 that has no speakerphone, but has a headset 500 in place of a speakerphone. Consequently, a speakerphone circuit 102 is not required, and is absent. However, set 100 of FIG. 5 does retain a portion of the functionality of speakerphone circuit 102, namely the relative audio signal levelsensing function of controller 130 of FIG. 3. Illustratively, FIG. 5 retains controller 130 of FIG. 3 and merely eliminates attenuators 110 and 120 of speakerphone circuit 102 of FIG. 4, for the purpose of controlling the output of alerting tone generator 115 as a function of speakerphone circuit states. The alerting tones generated by generator 115 are combined with the audio out signals on AUDIO OUT line 118 by an adder 116, as in FIG. 3, but the output of adder 116 is fed into headset 500 to produce audible signals.

Alternatively, a handset can be substituted for, or used in conjunction with headset 500.

FIG. 6 duplicates FIG. 5 with the exception that headset 500 is replaced by a handset 600 and a separate audible alert producer 200 is included in station set 100 of FIG. 6, as in FIG. 4. Consequently, the output of alerting tone generator 115 is not combined with audio out signals, but is fed to the input of producer 200, as in FIG. 4. Like set 100 of FIG. 5, set 100 of FIG. 6 continues to use the same alerting mechanism while it is on-hook and off-hook, and the volume of the audible alerting signals continues to be controlled by speakerphone circuit states.

Alternatively, a headset may be substituted for, or used in conjunction with handset 600.

Of course, it should be understood that various changes and modifications may be made to the above-described illustrative embodiment of the invention. For example, terminal station set may be either an analog or a digital set. Also, terminal station set need not be a telephone station set, but may be a part of any telecommunications system. Furthermore, while only 3 basic speakerphone states have been illustrated, there may be more than 3 states, each representing a different level of attenuation and/or amplification. Such changes and modifications may be made without departing from the spirit and the scope of the invention. It is therefore intended that such changes and modifications be covered by the following claims.

We claim:

1. A telecommunications station set comprising:
first means for converting received alerting signals into audible alerting signals;
second means responsive to communications signals received by the station set for generating a plurality of speakerphone control state signals; and
third means connected to the first and second means and supplying the alerting signals to the first means while the station set is on-hook and also while the station set is off-hook for conversion into audible signals, the third means responsive to the second means generating a first control state signal for supplying to the first means first alerting signals for conversion into first audible alerting signals having a volume, and further responsive to the second means generating a second control state signal for supplying to the first means second alerting signals for conversion into second audible alerting signals having a volume different from the volume of the first audible alerting signals.

2. The set of claim 1 wherein
the third means include:
a signal generator for generating a plurality of different alerting signals, responsive to the second means generating the first state signal for generating the first alerting signals and responsive to the second means generating the second state signal for generating the second alerting signals.

3. The set of claim 1 wherein
the second means comprise
a speakerphone control circuit having a plurality of control states for controlling operation of a speakerphone.

4. The set of claim 3 wherein
the first means comprise a speakerphone controlled by the speakerphone control circuit and including a loudspeaker for converting received signals, including received alerting signals, into audible signals.

5. The set of claim 3 wherein
the first means comprise sound-producing means dedicated to converting received alerting signals into audible alerting signals.

6. The set of claim 1 wherein
the second means comprise
means responsive to both communications signals received by the station set from an external telecommunications line and communications signals received from a user of the set for generating individual ones of (a) a first signal, representative of a first state for attenuating an output of a speakerphone microphone and (b) a second signal, representative of a second state for attenuating an input to a speakerphone loudspeaker.

7. The set of claim 6 wherein
the means for generating individual ones of the first signal and the second signal generate the individual ones of said signals in an absence of a speakerphone controlled by the second means.

8. The set of claim 7 wherein
the first means comprise
sound-producing means dedicated to converting received alerting signals into audible alerting signals.

9. The set of claim 7 wherein
the first means comprise
a headphone for the user of the set.

10. A telephone station set comprising:
a speakerphone including a loudspeaker;
a speakerphone control circuit connected to the speakerphone and having a plurality of control states for controlling operation of the speakerphone; and
first means connected to the loudspeaker and to the control circuit for generating alerting signals and supplying the alerting signals to the loudspeaker while the station set is on-hook and also while the station set is off-hook for conversion into audible alerting signals, the first means responsive to the control circuit being in a first control state for supplying to the loudspeaker first alerting signals for conversion into first audible alerting signals having a volume, and further responsive to the control circuit being in a second control state for supplying to the loudspeaker second alerting signals for conversion into second audible alerting signals having a volume different from the volume of the first audible alerting signals.

11. The set of claim 10 wherein
the first means include:
a signal generator for generating alerting signals that are all same;
means connected to the generator for combining the generated alerting signals with other signals incoming from a line connected to the telephone set for conversion into audible signals; and
means in the control circuit for receiving and attenuating the combined signals and sending the attenuated combined signals to the loudspeaker when the control circuit is in the first state, and for not attenuating the combined signals and sending the unattenuated combined signals to the loudspeaker when the control circuit is in the second state.

12. The set of claim 10 wherein
the first means include:
a signal generator for generating a plurality of different alerting signals, responsive to the control circuit being in the first state for generating the first alerting signals and responsive to the control circuit being in the second state for generating the second alerting signals.

13. The set of claim 10 wherein
the control circuit includes
means for attenuating signals incoming to the loudspeaker for conversion into audible signals and sending the attenuated signals to the loudspeaker when the control circuit is in the first state, and for not attenuating the incoming signals and sending the unattenuated signals to the loudspeaker when the control circuit is in the second state; and
the first means include
a signal generator for generating a plurality of different alerting signals, responsive to the control circuit being in the first state for generating the first alerting signals for conversion into the first audible alerting signals and responsive to the control circuit being in the second state for generating the second alerting signals for conversion into the second audible alerting signals having a volume louder that the volume of the first audible alerting signals, and
means connected to the attenuating means, to the signal generator, and to the loudspeaker, for combining the signals sent by the attenuating means and the alerting signals generated by the signal generator and sending the combined signals to the loudspeaker.

14. A telephone station set comprising:
means for generating signals on an outgoing line;
means for receiving signals on an incoming line; and
means for generating audible alerting signals while the station set is on-hook and also while the station set is off-hook and whose volume depends on activity states of the outgoing and incoming lines.

15. A telephone station set comprising:
means for generating outgoing telecommunication signals;
means for receiving incoming telecommunication signals;
means for generating audible alerting signals while the station set is on-hook and also while the station set is off-hook; and
means for controlling volume of the audible alerting signals as a function of strengths of the outgoing and the incoming telecommunication signals.

* * * * *